United States Patent
Oka et al.

(10) Patent No.: US 11,218,106 B2
(45) Date of Patent: Jan. 4, 2022

(54) ELECTRIC MOTOR DRIVING SYSTEM

(71) Applicants: DENSO CORPORATION, Kariya (JP); TOYOTA JIDOSHA KABUSHIKI KAISHA, Toyota (JP)

(72) Inventors: Haruka Oka, Kariya (JP); Ryuji Omata, Kariya (JP); Kiyotaka Matsubara, Ichinomiya (JP); Makoto Nakamura, Okazaki (JP); Daigo Nobe, Toyota (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 16 days.

(21) Appl. No.: 16/360,593

(22) Filed: Mar. 21, 2019

(65) Prior Publication Data
US 2019/0296677 A1    Sep. 26, 2019

(30) Foreign Application Priority Data

Mar. 22, 2018 (JP) .............................. JP2018-054637

(51) Int. Cl.
*H02P 25/22* (2006.01)
*H02P 27/06* (2006.01)
(Continued)

(52) U.S. Cl.
CPC ........ *H02P 27/06* (2013.01); *H02M 7/53871* (2013.01); *H02P 21/20* (2016.02); *H02P 25/024* (2016.02); *H02P 2205/05* (2013.01)

(58) Field of Classification Search
CPC .. H02M 7/53871; H02M 1/088; H02M 7/537; H02P 21/18; H02P 21/20; H02P 2205/05; H02P 27/06; H02P 21/50
(Continued)

(56) References Cited

U.S. PATENT DOCUMENTS 7,199,535 B2 * 4/2007 Welchko ............... B60L 15/025
                                                       318/105
2006/0273748 A1  12/2006 Yoshimoto et al.
(Continued)

FOREIGN PATENT DOCUMENTS

| JP | H07-035797 A | 2/1995 |
| JP | H07-135797 A | 5/1995 |
| JP | 3352182 B2 | 12/2002 |

*Primary Examiner* — Kawing Chan
*Assistant Examiner* — Zemenay T Truneh
(74) *Attorney, Agent, or Firm* — Oliff PLC

(57) ABSTRACT

An electric motor driving system controls driving of an electric motor having windings of two or more phases each having open ends by using a pair of inverters. A control unit includes a first inverter control circuit that generates a first voltage instruction output to the first inverter based on a torque instruction and a second inverter control circuit that generates a second voltage instruction output to the second inverter based on the torque instruction. At least one of the inverter control circuits includes an electric power controller that controls allocation of electrical power supplied from a pair of power supplies to the pair of inverters, respectively, by either advancing or delaying an angle of a phase of each of vectors of voltage instructions in accordance with the target electric power instruction during execution of torque feedback control.

6 Claims, 12 Drawing Sheets

(51) Int. Cl.
*H02M 7/5387* (2007.01)
*H02P 21/20* (2016.01)
*H02P 25/024* (2016.01)

(58) Field of Classification Search
USPC .................................. 318/400.02, 504, 105
See application file for complete search history.

(56) References Cited

U.S. PATENT DOCUMENTS

| | | | |
|---|---|---|---|
| 2009/0134828 A1* | 5/2009 | Chakrabarti | H02P 27/08 |
| | | | 318/440 |
| 2010/0123418 A1 | 5/2010 | Itoh et al. | |
| 2012/0032622 A1* | 2/2012 | Lipo | H02P 21/0089 |
| | | | 318/400.27 |
| 2012/0187893 A1* | 7/2012 | Baba | H02P 25/024 |
| | | | 318/722 |
| 2014/0225538 A1* | 8/2014 | Omata | H02P 21/34 |
| | | | 318/400.02 |
| 2019/0296663 A1 | 9/2019 | Oka et al. | |

* cited by examiner

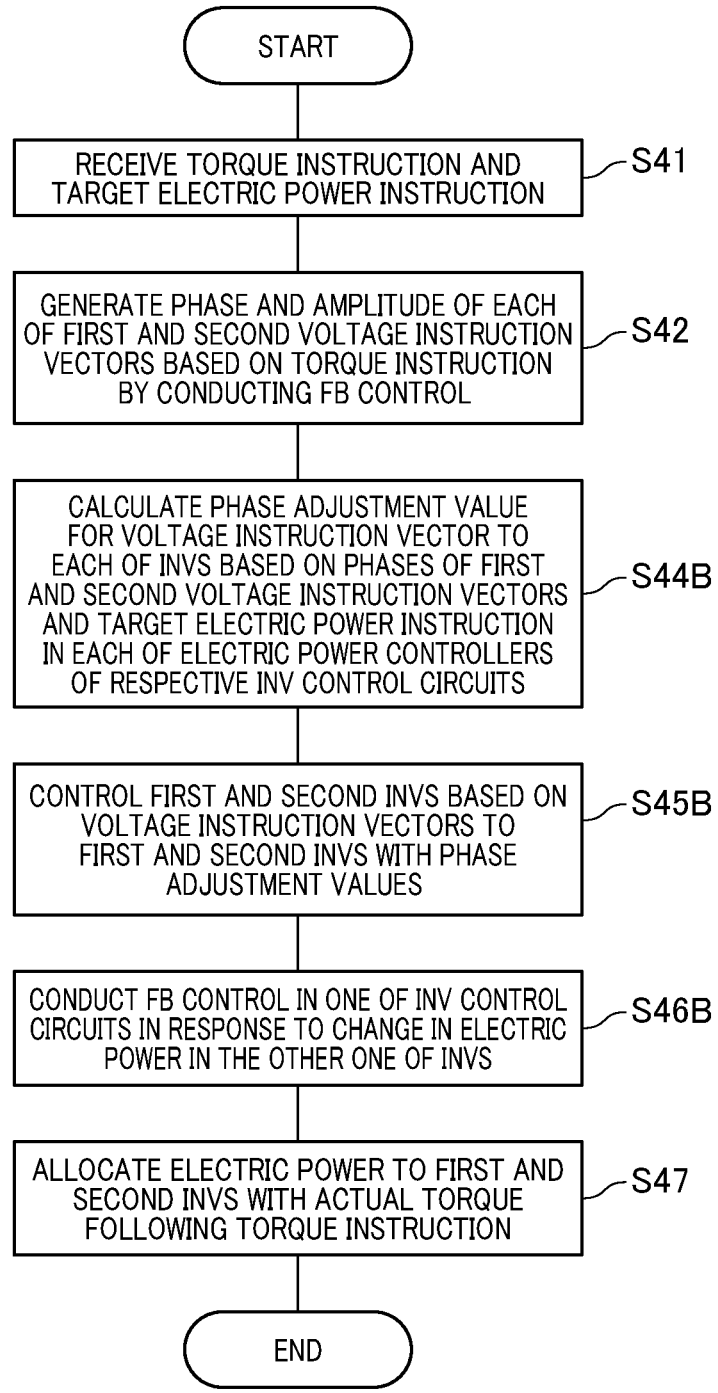

ELECTRIC MOTOR DRIVING SYSTEM

CROSS-REFERENCE TO RELATED APPLICATION

This patent application is based on and claims priority to Japanese Patent Application No. 2018-054637, filed on Mar. 22, 2018 in the Japan Patent Office, the entire disclosure of which is hereby incorporated by reference herein.

BACKGROUND

Technical Field

Embodiments of the present disclosure relate to an electric motor driving system that drives an electric motor by using a pair of inverters.

Related Art

It is known that a pair of inverters is connected to both ends of an open winding of an alternating current (AC) electric motor, respectively, and drives the AC electric motor by their outputs. For example, as discussed in Japanese Patent No. 3352182 (JP-3352182-B), an inverter system is composed of an electric circuit of a so-called dual power supply-dual inverter system. The inverter system combines outputs from first and second inverters having opposite polarities to each other.

A technology is also known in which electric power is transmitted from one of a pair of direct current (DC) power supplies to the other one of pair of DC power supplies. For example, Japanese Unexamined Patent Application Publication No. 2007-14185 (JP-2007-14185-A) discusses an electric power conversion system (i.e., a converter) configured by an electric circuit having a pair of power supplies and a single inverter. In the electric power conversion system, a first upper arm is connected to a fuel cell that serves as one of power supplies. A second upper arm is connected to a secondary cell that serves as the other one of power supplies. The first upper arm is connected to the second upper arm parallel to a common lower arm connected to the inverter. Each of electric powers supplied from the fuel cell and the secondary battery is controlled in accordance with a target allocation value.

Further, a technology in which torque feedback control is executed by adjusting a phase of a rectangular voltage wave is also known as discussed in Japanese Patent Application Publication No. 2010-124544 (JP-2010-124544-A), for example. However, JP-3352182-B simply discusses a basic control concept based on the electric circuit composed of the dual power supply-dual inverter system, and is completely absent to discuss electric power transportation and allocation between the pair of power supplies. Further, although JP-2007-14185-A discusses a technology in which electric power is transmitted from one of power supplies to the other one of power supplies, a voltage amplitude acts as a parameter of electric power transportation. Hence, when such a parameter is sought to be applied to a rectangular voltage wave control system of JP-2010-124544-A, since a voltage amplitude is fixed at a maximum value, neither electric power transportation nor allocation can be achieved in the system. That is, JP-2007-14185-A does not discuss that the electric power transportation and allocation is conducted based on the parameter of the voltage phase instead of the voltage amplitude. The present invention has been made in view of the above described problem, and an object thereof is to provide a novel electric motor driving system that includes a so-called dual power supply-dual inverter system, in which a voltage amplitude is fixed at a maximum value. In particular, a novel electric motor driving system is provided to adequately control allocation of electric power supplied from a pair of power supplies to a pair of inverters.

SUMMARY

Accordingly, one aspect of the present disclosure provides a novel electric motor driving system that controls driving of an electric motor composed of multiple windings of two or more phases each having opened ends by using a pair of inverters separately connected to a pair of power supplies, respectively. The electric motor driving system includes a first inverter, a second inverter, and a control unit. The first inverter receives an input of a direct current electric power from the first power supply.

The first inverter includes first multiple switching elements correspondingly attached to multiple ends of the wirings, respectively. The second inverter also receives an input of a direct current electric power from the second power supply. The second inverter includes second multiple switching elements correspondingly attached to the other multiple ends of the wirings, respectively. The control unit includes a first inverter control circuit to generate a first voltage instruction as an output voltage instruction supplied to the first inverter based on a torque instruction. The control unit also includes a second inverter control circuit to generate a second voltage instruction as an output voltage instruction supplied to the second inverter based on the torque instruction as well. Further, at least one of the first and second inverter control circuits includes an electric power controller to control allocation of electric power supplied from the first and second power supplies to the first and second inverters, respectively, in accordance with either a target allocation ratio of electric power or a target amount of electric power serving as a target power instruction for the first and second inverters when torque feedback control is executed. The electric power controller either advances or delays an angle of a phase of a voltage instruction vector in each of the pair of inverter control circuits so that either an electric power allocation ratio between the pair of inverters or amounts of electric power of the pair of inverters follow the target power instruction. Hence, the electric motor driving system of this embodiment of the present invention enables allocation control of electric power supplied from the pair of power supplies while maintaining a prescribed torque even when a voltage amplitude is fixed at a maximum value. Accordingly, a state of charge (herein after referred to as a SOC) and a voltage value can be adequately supervised while either preventing or suppressing a poor state of charge and degradation of a battery in an applicable one of the power supplies.

For example, since it includes the electric power controller, any one of the pair of inverter control circuits acts as an electric power supervising circuit. Since it excludes the electric power controller, the other one of the pair of inverter control circuits acts as a power non-supervising circuit, thereby being affected by control of the electric power supervising circuit. The electric power controller of the electric power supervising circuit changes only a phase of a voltage instruction vector in the power supervising circuit. With such a configuration, the electric power supervising circuit adjusts a voltage instruction supplied to an inverter controlled by the power supervising circuit so that an amount of electric power allocated to the inverter reaches a value of the target power instruction. Subsequently, when the amount of the electric power of the inverter controlled by the power supervising circuit approximates the value of the target power instruction, the electric power non-supervising circuit applies feedback control to a voltage instruction therein so that an actual torque can follow a torque instruction in response to such a change. As a result, an amount of electric power of the inverter controlled by the non-power supervising circuit also reaches a desired level, thereby collectively achieving electric power allocation as targeted. In another aspect of the present invention, the pair of inverter control circuits may include electric power controllers, respectively.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 12 is a flowchart illustrating exemplary electric power allocation sequence conducted by the electric power controller according to the fourth embodiment of the present invention.

DETAILED DESCRIPTION

Herein below, various embodiments and their modifications of the present invention are described with reference to applicable drawings. An electric motor driving system of each of the embodiments of the present invention is a driving system that drives an electric motor generator (hereafter simply referred to as a MG) of a 3-phase AC motor that acts as a power source for hybrid and electric vehicles to control driving of the MG. The electric motor and the electric motor driving system are herein below sometimes referred to as the MG and a MG control system, respectively.

Figure 1:
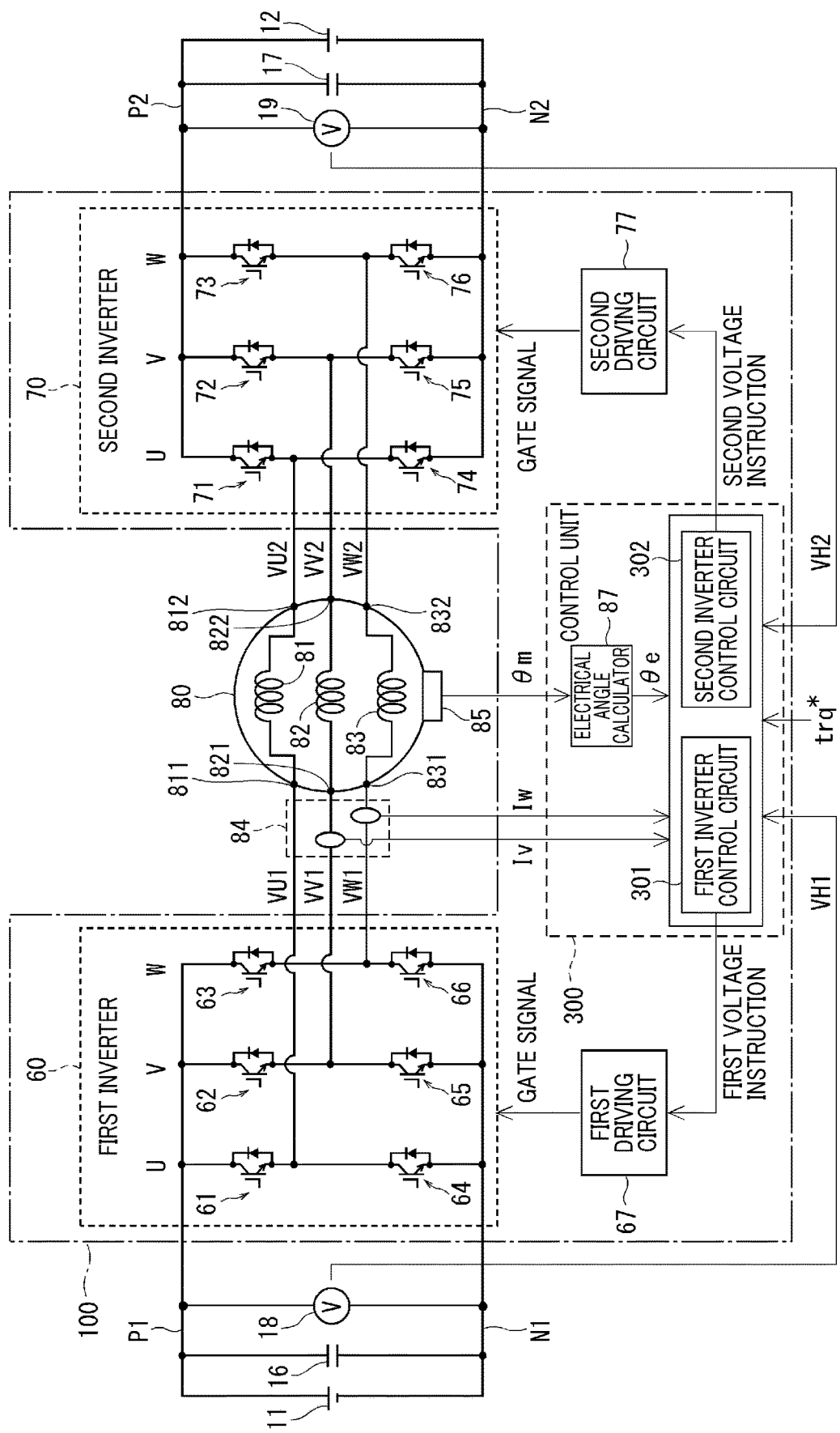
FIG. 1 is a diagram illustrating an overall structure of an exemplary system, to which various embodiments of electric motor driving systems of the present invention are applied.
Figure 2:
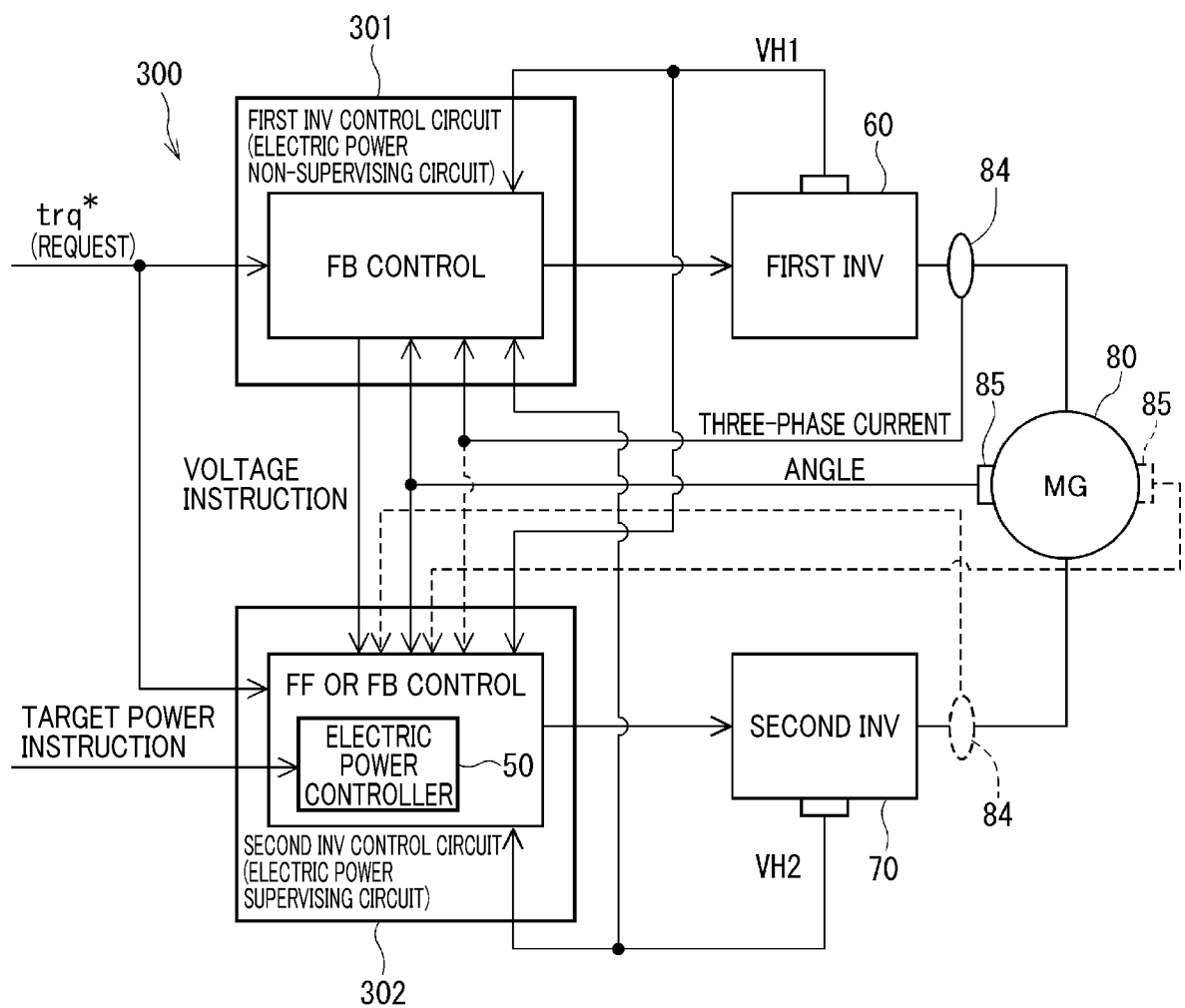
FIG. 2 is a diagram schematically illustrating an exemplary control unit employed in the first to third embodiments of the present invention.

Referring now to the drawings, wherein like reference numerals designate identical or corresponding parts throughout the several views thereof, and in particular to FIG. 1, an overall structure of a system that employs a so-called dual power supply-dual inverter (i.e., a pair of power supplies 11 and 12, and a pair of inverters 60 and 70) is illustrated. Specifically, a MG 80 is provided by including a three-phase AC electric motor of a permanent magnet synchronous motor type having a U-phase winding 81, a V-phase winding 82 and a W-phase winding 83. Hence, when it is applied to a hybrid vehicle, the MG 80 functions as an electric motor to generate a torque to drive a driving wheel thereof. The MG 80 also functions as a generator to generate electricity when driven by kinetic energy from an engine and/or the driving wheel of the hybrid vehicle.

The MG 80 of this embodiment of the present invention employs an open winding system, so that end points (i.e., ends) of one of the three-phase windings 81, 82 and 83 (i.e., the U-phase winding 81, the V-phase winding 82 and the W-phase winding 83) are separated from end points of the other two of the three-phase windings 81, 82 and 83 as shown in the drawing. That is, output terminals of respective phases of the first inverter 60 are connected to corresponding multiple ends 811, 821 and 831 of the three-phase windings 81, 82 and 83, respectively. Similarly, output terminals of respective phases of the second inverter 70 are connected to the other corresponding ends 812, 822 and 832 of the three-phase windings 81, 82 and 83, respectively. A rotation angle sensor 85 is provided by including a resolver or the like to detect a mechanical angle θm of the MG 80. The mechanical angle θm is converted into an electrical angle θe by an electrical angle calculator 87 included in a control unit 300.

The first power supply 11 and the second power supply 12 serve as chargeable and dischargeable electrical storage devices, respectively, and are separated and insulated from each other. Each of the electrical storage devices employs a secondary battery, such as nickel-metal hydride, lithium-ion, etc., or an electric double-layer capacitor and the like. However, the first power supply 11 can employ an output type lithium-ion battery. Also, the second power supply 12 can employ a capacitance-type lithium-ion battery, for example. The respective inverters 60 and 70 receive direct current (DC) powers from the respective power supplies 11 and 12, separately. Hence, the first power supply 11 can supply and receive the electric power to and from the MG 80 via the first inverter 60. Similarly, the second power supply 12 can also supply and receive the electric power to and from the MG 80 via the second inverter 70 as well.

Hence, the MG 80 receives electric power from the first power supply 11 via the first inverter 60. The MG 80 also receives electric power from the second power supply 12 via the second inverter 70 as well. To respective sides of the three-phase windings 81, 82 and 83 facing the first inverter 60, a U-phase voltage VU1, a V-phase voltage VV1 and a W-phase voltage VW1 are applied. Similarly, to other respective sides of the three-phase windings 81, 82 and 83 facing the second inverter 70, a U-phase voltage VU2, a V-phase voltage VV2 and a W-phase voltage VW2 are also applied similarly.

Further, multiple current sensors 84 may be provided in multiple electric power paths extended from the first inverter 60 to the MG 80 to detect phase currents carried to the three-phase windings 81, 82 and 83. Although a V-phase current Iv and a W-phase current Iw are detected as one example in FIG. 1, any currents of either two-phase currents or three-phase currents may be detected by the multiple current sensors 84. The multiple current sensors 84 may also be disposed in electric power paths extended from the second inverter 70 to the MG 80 as well. Furthermore, the current sensor 84 may be disposed in these pairs of electric power paths extended from both of the first and second inverters 60 and 70 to the MG 80, respectively.

A first capacitor 16 is provided between a high voltage side wiring P1 and a low voltage side wiring N1 and is connected to these wirings P1 and N1 at its both ends. Similarly, a second capacitor 17 is also provided between a high voltage side wiring P2 and a low voltage side wiring N2 and is connected to these wirings P2 and N2 at its both ends. A first voltage sensor 18 is also provided to detect an input voltage VH1 input from the first power supply 11 to the first inverter 60. A second voltage sensor 19 is also provided to detect an input voltage VH2 input from the second power supply 12 to the second inverter 70.

The first inverter 60, the second inverter 70, the control unit 300 and first and second driving circuits 67 and 77 collectively constitute a MG control system 100. Further, the first inverter 60 includes six first switching elements 61 to 66 correspondingly connected to the respective phases of the windings 81, 82 and 83 on a bridge basis. As shown in the drawing, the switching elements 61, 62 and 63 are located in upper arms of the U-phase, the V-phase and the W-phase, respectively. The switching elements 64, 65 and 66 are similarly located in lower arms of the U-phase, the V-phase and the W-phase, respectively. Similarly, the second inverter 70 also includes six second switching elements 71 to 76 correspondingly connected to the respective phases of the windings 81, 82 and 83 on a bridge basis. As shown in the drawing, the switching elements 71, 72 and 73 are located in the other upper arms of the U-phase, the V-phase and the W-phase, respectively. The switching elements 74, 75 and 76 are similarly located in the other lower arms of the U-phase, the V-phase and the W-phase, respectively. Each of the switching elements 61 to 66 and 71 to 76 is configured, for example, by an insulated gate bipolar transistor (IGBT). Further, as shown in the drawing, multiple reflux diodes are connected parallel to each other to allow each of currents to flow from the low voltage side to the high voltage side. To prevent short circuit possibly caused between the high voltage side wirings P1 and P2 and the low voltage side wirings N1 and N2, respectively, these elements (i.e., the switching elements) 61 to 66 and 71 to 76 of the respective phases of the upper and lower arm are not simultaneously turned on. For example, these elements 61 to 66 and 71 to 76 of the respective phases of the upper and lower arm are complementarily turned on and off such that when one of the elements 61 to 63 and 71 to 73 of the upper arm is turned on, the other one of the elements 64 to 66 and 74 to 76 of the lower arm is turned off.

Further, although none of these devices are illustrated, the control unit 300 is configured by a microcomputer or the like at least including a central processing unit (CPU), a read only memory (ROM), an input/output (I/O) port, and a bus line to connect these devices with each other. With such devices, the control unit 300 executes both of a software process, in which the CPU runs prescribed program stored in a memory system (i.e., a readable and non-transitory tangible recording medium) such as the ROM, etc., and a hardware process by using a dedicated electronic circuit as well. The control unit 300 further includes a first inverter control circuit 301 that generates a first voltage instruction supplied to the first inverter 60 as an output voltage instruction based on a torque instruction trq* and a prescribed detection value as well. The control unit 300 also includes a second inverter control circuit 302 that generates a second voltage instruction supplied to the second inverter 70 as an output voltage instruction based on the torque instruction trq* and a prescribed detection value as well. To the first and second inverter control circuits 301 and 302, an electrical angle θe is commonly and a pair of input voltages VH1 and VH2 or the like are respectively input, for example. As described later more in detail, according to one embodiment of the present invention, phase currents Iv and Iw are fed back at least to the first inverter control circuit 301. That is, the phase currents Iv and Iw are fed back to either only the first inverter control circuit 301 or both of the first and second inverter control circuits 301 and 302. Further, a first driving circuit 67 is provided to generate and output a gate signal to the first inverter 60 based on a first voltage instruction generated by the first inverter control circuit 301. A second driving circuit 77 is similarly provided to generate and output a gate signal to the second inverter 70 based on a second voltage instruction generated by the second inverter control circuit 302 as well.

As described earlier, JP-3352182-B similarly discusses an inverter system that also drives an electric motor with a system of a so-called dual power supply-dual inverter. However, in a system with the so-called dual power supply-dual inverter, when a pair of inverter control circuits controls voltage instructions as requested, input and output electric powers supplied to and from corresponding power supplies are not precisely determined, accordingly. As a result, one power supply may enter a poor state of charge condition (a so-called SOC exhaustion) or a battery thereof is degraded (battery degradation) in some cases.

Further, as described earlier, JP-2007-14185-A discusses a technology in which electric power is transmitted from one power supply to the other power supply. However, when rectangular voltage wave control is executed in a torque feedback control system, neither transportation of electric power nor allocation of electric power can be achieved, because a voltage amplitude is fixed at a maximum value.

According to one embodiment of the present invention, to realize transportation of electric power between the pair of power supplies and allocation of electric power of the pair of power supplies even when a voltage swing is fixed at a maximum level as in a general torque feedback control system, a change in voltage phase is focused on. The reasons for focusing on this are that, in two or more inverters, input and output electric power is determined based on a power factor, which is calculated based on a difference between a current phase and a voltage phase, and an amplitude of current as well. Further, current flowing into more than two inverters is substantially the same. Accordingly, it is an object of one embodiment of the present invention to enable transportation and allocation of electric power of the power supplies even when the rectangular voltage wave control is executed. That is, only the voltage phase acts as a parameter to execute electric power transportation and allocation.

Now, first to third embodiments of the present invention are described with reference to FIGS. 2 to 10. First, the control unit 300 is described more in detail with reference to FIG. 2, wherein and in the following drawings, a label INV represents an inverter. The first inverter control circuit 301 and the second inverter control circuit 302 may be arranged in either respective two microcomputers or a common single microcomputer. To operate as a system of the so-called dual power supply-dual inverter, each of the first and second inverter control circuits 301 and 302 generates an independent but cooperative voltage instruction.

Since the MG 80 is a common target, the control unit 300 commonly obtains detection values of an angle (specifically, an electrical angle θe) and a three phase current. However, as shown by a broken line, more than two current sensors 84 and rotary angle sensors 85 can be employed, so that each of inverter control circuits 301 and 302 can obtain corresponding detection values. Further, although a torque estimated from a current is fed back in this embodiment of the present invention, a torque detection value may also be commonly used when a system directly detects the torque. Also, a detection value of the three phase current shown by a broken line is not necessarily obtained when the second inverter control circuit 302 conducts feedforward control.

According to the first to third embodiments of the present invention, an electric power controller 50 is only provided in one of the pair of inverter control circuits 301 and 302 of the control unit 300. Specifically, in the example of FIG. 2, since it includes the electric power controller 50, the second inverter control circuit 302 acts as an electric power supervising circuit. By contrast, since it excludes the electric power controller 50, the first inverter control circuit 301 acts as an electric power non-supervising circuit. Hence, the second inverter control circuit 302 generates a voltage instruction by conducting either feed-forward (FF) control or feedback (FB) control to act as the electric power supervising circuit. By contrast, the first inverter control circuit 301 as the electric power non-supervising circuit generates a voltage instruction by conducting feed-back (FB) control. However, the first inverter control circuit 301 and the second inverter control circuit 302 may switch their functions.

As shown in the drawing, the electric power controller 50 of the second inverter control circuit 302 obtains a target power instruction from an external engine control unit (ECU) having a higher rank. The electric power controller 50 also obtains a first voltage instruction generated by the first inverter control circuit 301 by conducting the feedback control. The electric power controller 50 further obtains a second voltage instruction generated by the second inverter control circuit 302 by conducting either feed-forward (FF) control or feedback (FB) control. Thus, based on these information elements, the electric power controller 50 generates a post allocation voltage instruction to be output to the second inverter 70 (i.e., an inverter controlled by the electric power supervising circuit).

More specifically, the electric power controller 50 adjusts the voltage instruction of the second inverter control circuit 302 so that an amount of electric power allocated to the second inverter 70 (i.e., an inverter controlled by the electric power supervising circuit) becomes equivalent to a value of the target power instruction. When an amount of electric power generated by the second inverter 70 approximates the value of the target power instruction, the first inverter control circuit 301 (acting as the electric power non-supervising circuit) applies the feedback control to the first voltage instruction so that an actual torque can follow the torque instruction in response to such approximation. As a result, an amount of electric power of the first inverter 60 (i.e., an inverter controlled by the electric power non-supervising circuit) also becomes equivalent to a desired value, so that the electric power can be allocated as targeted.

Figure 3:
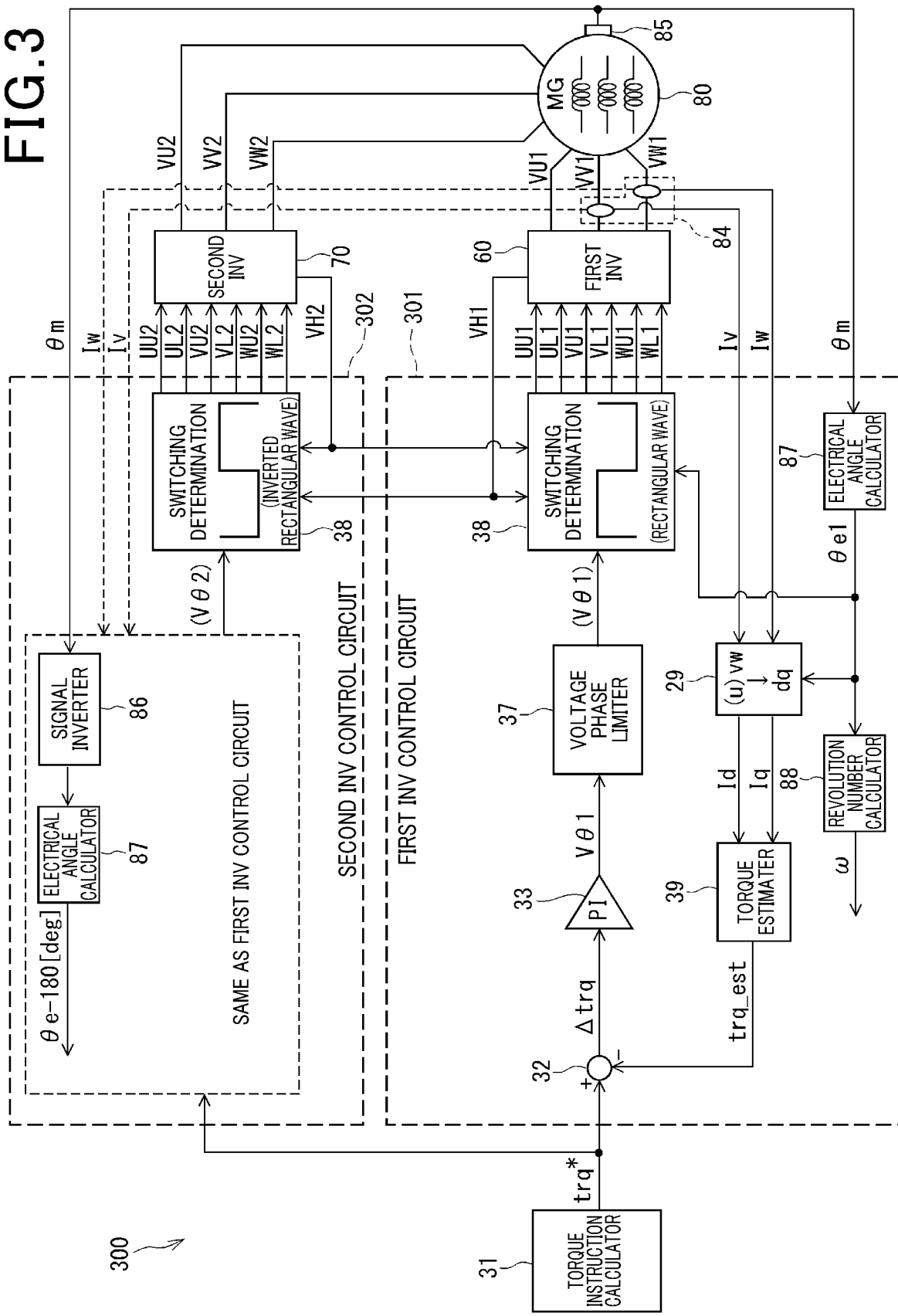
FIG. 3 is a block diagram illustrating an exemplary control unit except for an electric power controller according to one embodiment of the present invention.

Now, with reference to FIG. 3, an overall structure of the pair of inverter control circuits 301 and 302 excluding the electric power controller 50 is described according to one embodiment of the present invention. As shown, the first inverter control circuit 301 is provided by including a torque subtracter 32, a PI controller 33, a voltage phase limiter 37, a modulator 38, and a dq converter 29 or the like. However, a configuration to calculate a voltage amplitude is omitted.

An electrical angle calculator 87 is also provided to convert a mechanical angle θm detected by a rotation angle sensor 85 into an electrical angle θe. A revolution number calculator 88 is also provided to convert the electrical angle θe into either an electrical angular velocity by differentiating the electrical angle θe by time or a number of revolutions ω by multiplying the electrical angular velocity by a prescribed coefficient. The number of revolutions ω is utilized by the electric power controller 50 of the second embodiment of the present invention to execute calculation. The electrical angle calculator 87 and the revolution number calculator 88 may be arranged within a control unit 300 disposed outside the first inverter control circuit 301. As shown in the drawing, various reference characters indicated within the first and second inverter control circuits 201 and 202 are suffixed by numerals 1 and 2, respectively, for the purpose of easy understanding of correspondence. By contrast, since it is commonly input to the first and second inverter control circuits 201 and 202, the mechanical angle θm is not suffixed by either the numeral 1 or the numeral 2.

A torque instruction trq* is input from a torque instruction calculator 31 provided in a upper lank ECU, for example. The dq converter 29 applies coordinate conversion to a pair of phase currents Iv and Iw obtained from the current sensor 84, thereby generating a pair of dq-axes currents Id and Iq by using the electrical angle θe, respectively. The dq converter 29 subsequently feeds back these conversion results. A torque estimation unit 39 is provided and calculates a torque estimation value trq_est using an formula (1) listed below based on the dq axes currents Id and Iq, a reverse voltage constant φ, dq axis inductances Ld and Lq, and the number of pole pairs p of the motor (MG) 80 as well.

$$trq\_est = p \times \{Iq \times \phi + (Ld - Lq) \times Id \times Iq\} \quad \text{(Formula 1)}$$

The torque subtractor 32 calculates a torque deviation Δtrq between the torque instruction trq* and a torque estimation value trq_est. The PI controller 33 executes PI calculation to obtain a voltage phase Vθ1 capable of bringing the torque deviation Δtrq close to zero (numeral 0). A voltage phase limiter 37 is provided and limits the voltage phase Vθ1 to a prescribed value. A modulator 38 is provided and obtains input voltages VH1 and VH2 from the respective inverters 60 and 70 and generates gate signals UU1, UL1, VU1, VL1, WU1 and WL1 to be supplied to the respective switching elements 61 to 66 of the first inverter 60 by conducting rectangular wave control.

Similar to a configuration and operation of the first embodiment of the present invention, when the second inverter control circuit 302 conducts feedback control, a phase Vθ2 of a second voltage instruction vector is calculated. The phase Vθ2 of the second voltage instruction vector can also be calculated when the feed-forward control is conducted as well.

Further, in the second inverter control circuit 302, a mechanical angle θm input from the rotation angle sensor 85 is inverted by a signal inverting unit 86 provided therein and is subsequently converted into an electrical angle (θe−180

[deg]) by an electrical angle calculator 87 also provided therein. Further, a modulator 38 provided in the second inverter control circuit 302 obtains the pair of input voltages VH1 and VH2 and generates multiple gate signals UU2, UL2, VU2, VL2, WU2 and WL2 by conducting opposite rectangular wave control to that conducted by the first inverter control circuit 301. The multiple gate signals UU2, UL2, VU2, VL2, WU2 and WL2 are subsequently supplied to the respective switching elements 71 to 76 of the second inverter 70.

Figure 4:
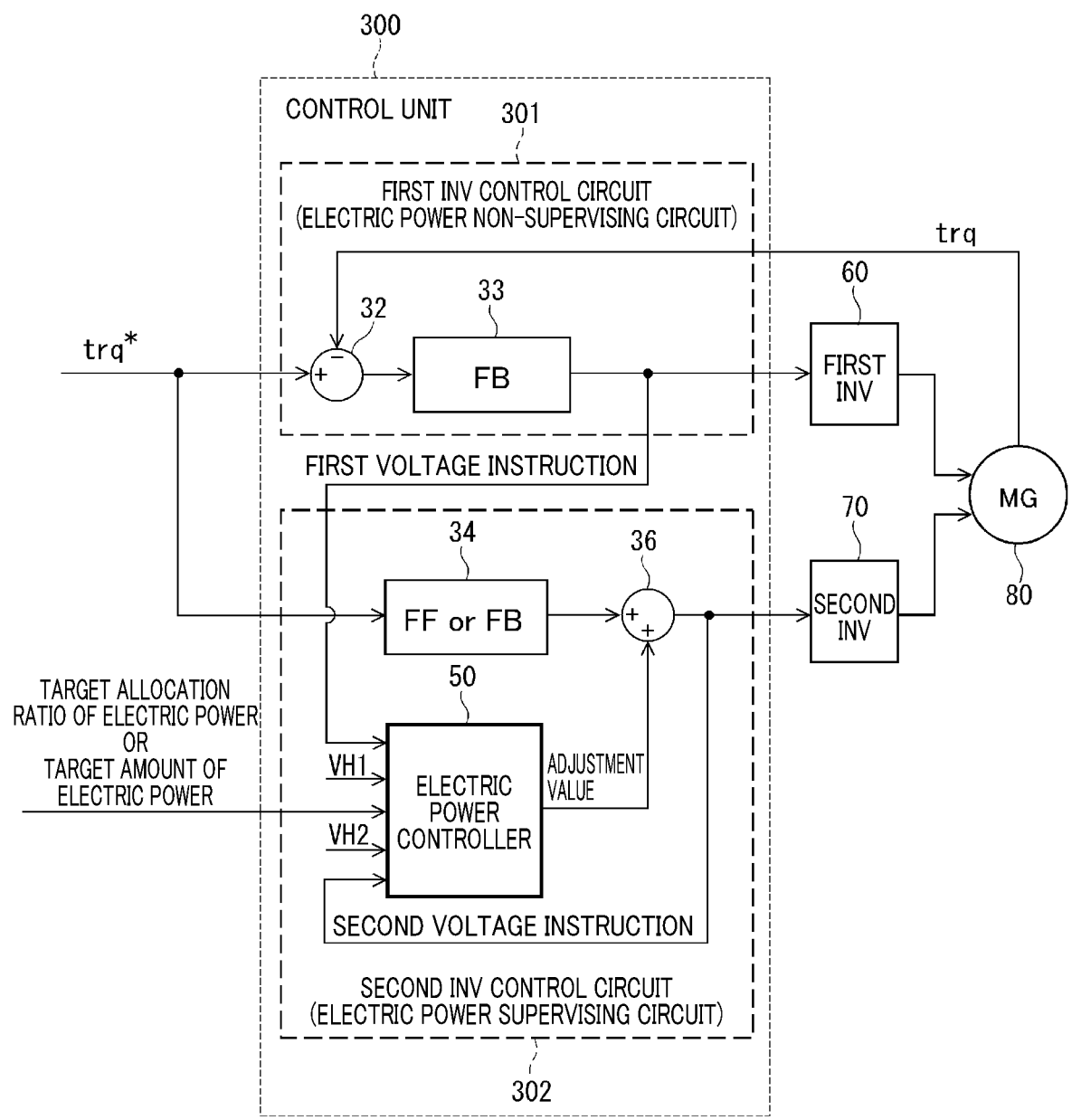
FIG. 4 is a block diagram schematically illustrating various signals input and output to and from devices included in the electric power controller according to one embodiment of the present invention.
Figure 5:
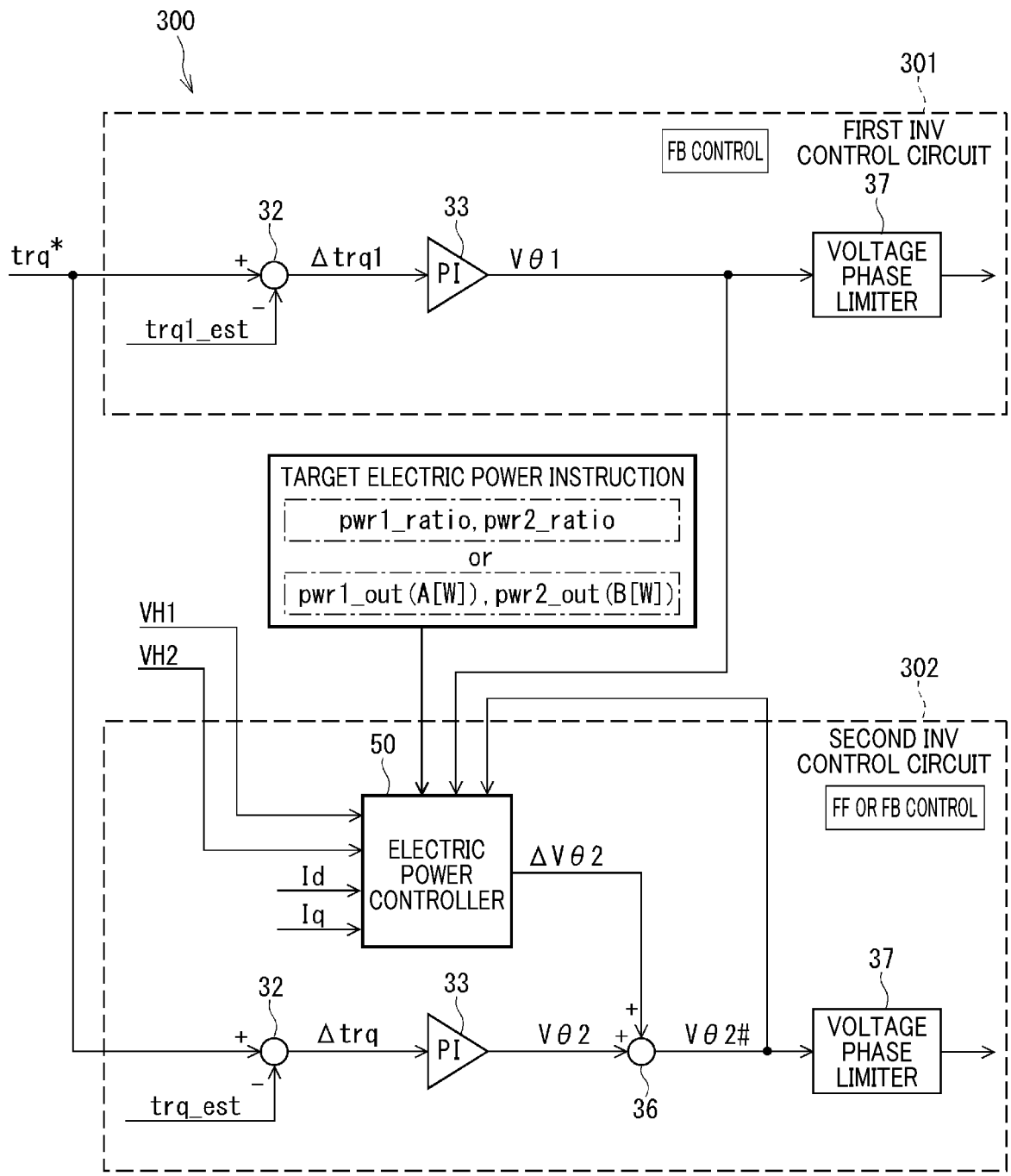
FIG. 5 is a block diagram specifically illustrating various signals input and output in the electric power controller according to first to third embodiments of the present invention.

Now, various signals input and output to and from the electric power controller 50 are described with reference to block diagrams of FIGS. 4 and 5. That is, FIG. 4 is a diagram schematically illustrating a basic configuration. FIG. 5 is a diagram more precisely illustrating a basic configuration additionally including the electric power controller 50 illustrated in FIG. 3. As illustrated in FIG. 4, in the first inverter control circuit 301, the PI controller 33 of FIG. 3 is represented as a feedback calculator 33. As shown, a system that calculates the torque estimation value trq_est based on the dq axes currents Id and Iq is omitted. By contrast, a system in which the actual torque trq is fed back to the torque deviation calculator 32 is illustrated. In the second inverter control circuit 302 of FIG. 4, a reference numeral 34 is attached to a block of the feed-forward and feedback calculator as shown.

In the second inverter control circuit 302 acting as the electric power supervising circuit, the electric power controller 50 is disposed. To the electric power controller 50, a first voltage instruction generated in the first inverter control circuit 301, a second voltage instruction generated in the second inverter control circuit 302, and a pair of input electric powers VH1 and VH2 supplied from the respective inverters 60 and 70 are input. Also input to the electric power controller 50 is one of a target allocation ratio of electric power and a target amount of electric power each acting as a target electric power instruction. The electric power controller 50 subsequently generates an adjustment value based on these information items to be used in allocation. The adjustment value is subsequently added to the second voltage instruction output by the feed-forward and feedback calculator 34 in an adjustment value adder 36 also provided in the second inverter control circuit 302. In FIG. 5, a target allocation ratio of electric power targeted by the first inverter 60 is represented by a character string pwr1_ratio. A target allocation ratio of electric power targeted by the second inverter 70 is represented by a character string pwr2_ratio as well. Further, a target amount of electric power targeted by the first inverter 60 is represented by a character string of either pwr1_out or A[W]. A target amount of electric power targeted by the second inverter 70 is represented by a character string of either pwr2_out or B [W] as well.

As shown in FIG. 5, a phase V$\theta$1 of a first voltage instruction vector, a phase V$\theta$2# of a second voltage instruction vector obtained after allocation, and substantially the same currents Id and Iq enter the electric power controller 50. Also entering the electric power controller 50 are a pair of input electric powers VH1 and VH2 from the respective inverters 60 and 70 and a target power instruction. A phase adjustment amount $\Delta$V$\theta$2 generated by the electric power controller 50 is added to the phase V$\theta$2 of the second voltage instruction vector in the adjustment value adder 36. In this way, a value obtained by adding the phase adjustment volume $\Delta$V$\theta$2 to the phase V$\theta$2 of the second voltage instruction vector is output to the voltage phase limiter 37 as the phase V$\theta$2# of the second voltage instruction vector after allocation.

An exemplary principle of operation of each of the first to third embodiments of the present invention is herein below briefly described. That is, the voltage phase $\Delta$V$\theta$2# obtained by adding the phase adjustment volume $\Delta$V$\theta$2 for allocation to the phase V$\theta$2 of the second voltage instruction vector generated in the second inverter control circuit 302 (that conducts power control) is supplied (to the second inverter 70) as an instruction. A change appears in response to the instruction. Then, the inverter control circuit 301 that supervises a torque reacts to the change and controls an actual torque trq to follow the torque instruction trq*, thereby achieving electric power allocation to each of the inverters 60 and 70 as targeted.

When it conducts feed-forward control, the second inverter control circuit 302 can more precisely execute control in response to the target electric power instruction. When it conducts feedback control, the second inverter control circuit 302 can again more precisely execute control in response to the torque instruction. Hence, in each of the first to third embodiments of the present invention, one of the inverter control circuits including the electric power controller 50 functions as the electric power supervising circuit, and the other one of the inverter control circuits of the power non-supervising circuit functions to maintain a prescribed torque. As a result, the inverter control circuits can accurately operate to realize respective target values with output values being easily predicted.

Now, an exemplary power allocation sequence conducted by the electric power controller 50 in the first to third embodiments of the present invention is described with reference to a flowchart of FIG. 6. Herein below, a step suffixed by a letter "A" indicates a step different from that in a flowchart of FIG. 12.

Specifically, in step S41, the electric power controller 50 receives a torque instruction trq* and a target power instruction as well. In step S42, the first inverter control circuit 301 and the second inverter control circuit 302 generate a phase V$\theta$1 and an amplitude Vamp1 of a first voltage instruction, and a phase V$\theta$2 and an amplitude Vamp2 of a second voltage by conducting feedback control based on the torque instruction trq*, respectively. In step S44A, the electric power controller 50 of the second inverter control circuit 302 calculates a phase adjustment volume $\Delta$V$\theta$2 for the second voltage instruction vector based on the first and second voltage instructions and the target power instruction as well. In step S45A, the second inverter control circuit 302 controls the second inverter 70 based on a voltage phase V$\theta$2# of the second voltage instruction vector obtained after the allocation as the sum of the voltage phase V$\theta$2 and the phase adjustment volume $\Delta$V$\theta$2. In step S46A, in response to a change in electric power of the second inverter 70, the first inverter control circuit 301 conducts the feedback control. In step S47, electric power is allocated to both of the first inverter 60 and the second inverter 70 while rendering a torque following the instruction trq*.

Now, a basic theory of electric power allocation employed in the electric power controller 50 is described with reference to FIG. 7. That is, in one embodiment of the present invention, in accordance with a magnitude relation between a request electric power instruction value and a current and actual electric power value of each of the pair of inverters 60 and 70, a phase of the voltage instruction vector is either advanced or delayed to adjust an amount of electric power allocated to the pair of inverters 60 and 70 and output to the MG 80. Hence, by changing the voltage phase and thereby varying a power factor caused by a difference between a voltage phase and a current phase, allocation of electric power to the pair of inverters 60 and 70 can be achieved.

More specifically, as discussed in JP-3352182-B, in the so-called dual power supply-dual inverter system, when the two inverters 60 and 70 cooperate and generate a maximum output, voltage phases of the respective inverters 60 and 70 have opposite polarities to each other, i.e., a difference between the voltage phases of the inverters 60 and 70 is an angle of 180 degree. Hence, as described in the drawing, the first voltage instruction vector V1 is illustrated as is, while the second voltage instruction vector V2 is illustrated by rotating it around a coordinate origin by the angle of 180 degree so that these voltage phases of the respective vectors almost align with each other.

Figure 7:
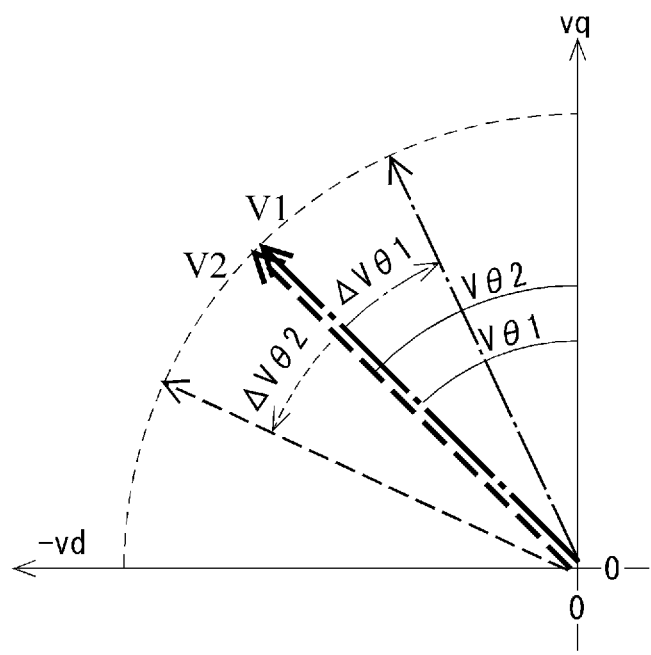
FIG. 7 is a diagram illustrating a basic theory of electric power allocation conducted by the electric power controller according to one embodiment of the present invention.

That is, as shown in FIG. 7, one example of changing the phases Vθ1 and Vθ2 of the respective first and second voltage instruction vectors V1 and V2 on condition that the pair of power supplies have the same voltage with each other and respective voltage amplitudes are fixed at maximum levels is demonstrated. As shown there, each of the voltage phases Vθ1 and Vθ2 is defined as a phase increasing counterclockwise regarding a positive direction of a q-axis as a reference. As shown by arrows indicated by broken bold lines, the phases Vθ1 and Vθ2 of the respective voltage instruction vectors V1 and V2 align with each other before a phase change. Here, as a matter of convenience of illustration and recognition, the voltage instruction vectors V1 and V2 are separated slightly.

In the drawing, a pair of arrows indicated by a broken thin line indicates the respective voltage instruction vectors V1 and V2 after the phase change. In the electric power allocation process of one embodiment of the present invention, an angle of the first voltage instruction vector V1 may be delayed by a voltage phase adjustment volume ΔVθ1. By contrast, an angle of the second voltage instruction vector V2 may be advanced by a voltage phase adjustment volume ΔVθ2. Here, a total electric power Pwr_all of two inverters 60 and 70 is represented by using a voltage effective value Vmean, a current effective value Irms, and a power factor angle φ as listed on a first line of the formula (2). An expression of the first line is rewritten to an expression of a second line by using an amplitude Vamp, a phase Vθ, and substantially the same current amplitude Iamp of a synthesis vector. Further, the expression of the second line is rewritten to an expression of a third line by using amplitudes Vamp1 and Vamp2, and phases Vθ1 and Vθ2 of the respective voltage instruction vectors V1 and V2. First and second terms of the expression of the third line represent electric power allocation to the respective inverters 60 and 70. Hence, the electric power allocation can be adjusted by either advancing or delaying angles of the voltage phases Vθ1 and Vθ2 of the respective voltage instruction vectors V1 and V2.

$$Pwr_{all} = \sqrt{3} \times Vmean \times Irms \times \cos\varphi\Psi = \qquad \text{(Formula 2)}$$

$$\sqrt{3} \times Vamp \times \frac{1}{\sqrt{3}} \times Iamp \times \cos(V\theta - I\theta) =$$

$$Vamp1 \times Iamp \times \cos(V\theta 1 - I\theta) +$$

$$Vamp2 \times Iamp \times \cos(V\theta 2 - I\theta)$$

Figure 8:
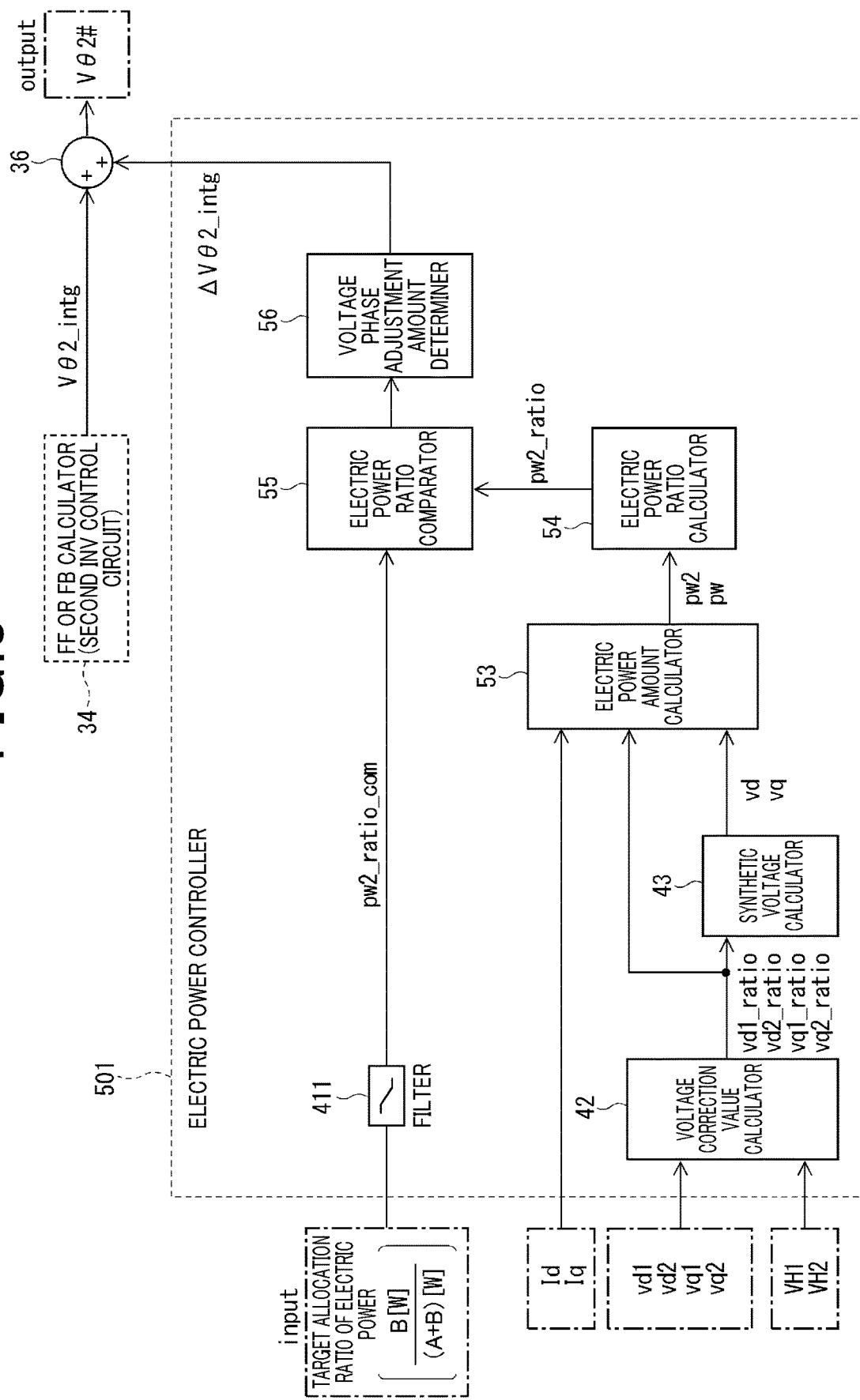
FIG. 8 is a block diagram illustrating an exemplary electric power controller according to the first embodiment of the present invention.
Figure 9:
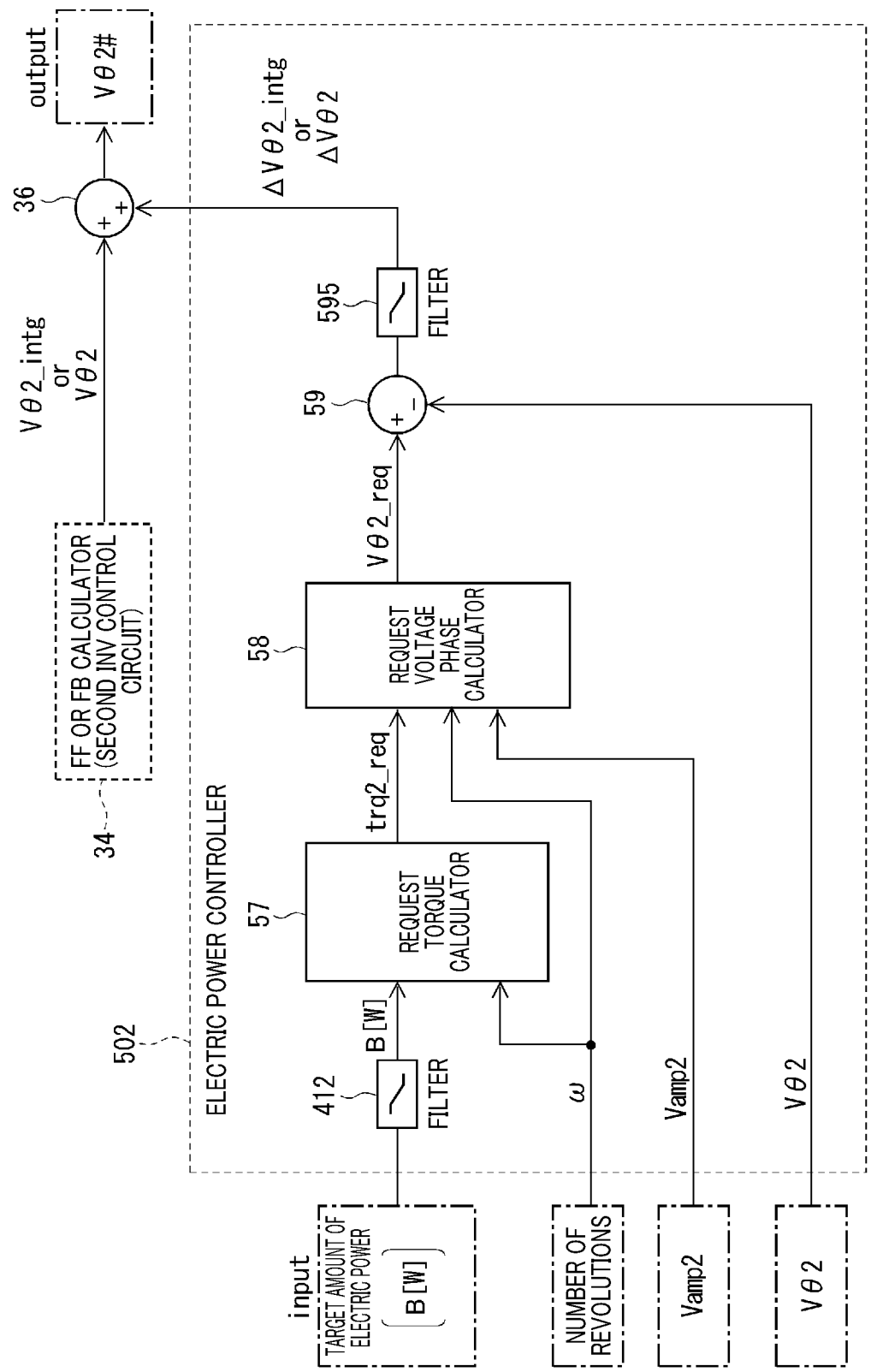
FIG. 9 is a block diagram also illustrating an exemplary electric power controller according to the second embodiment of the present invention.
Figure 10:
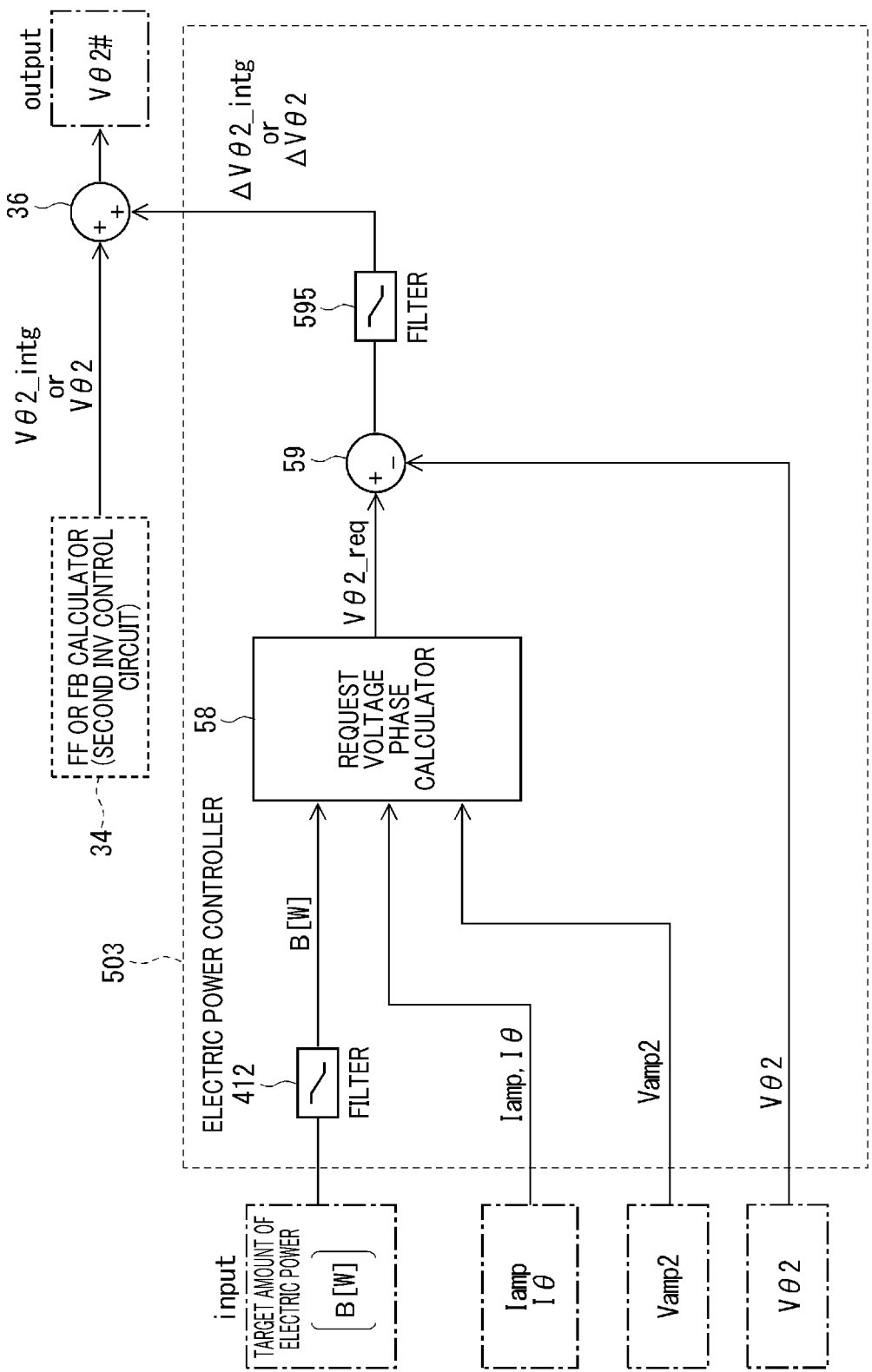
FIG. 10 is a block diagram further illustrating an exemplary electric power controller according to the third embodiment of the present invention.

Now, an exemplary configuration and operation of the electric power controller 50 employed in each of the first to third embodiments of the present invention is described more in detail with reference to FIGS. 8 to 10. Herein below, a reference number assigned to the electric power controller of each of the embodiments includes a numeral 50 at first and second digits and the number of the embodiment at a third digit following the numeral 50.

First, an exemplary configuration and operation of an electric power controller 501 according to a first embodiment of the present invention is described with reference to FIG. 8. In the first embodiment, a target allocation ratio of electric power of an amount of electric power targeted by the second inverter 70 to a total amount of electric power collectively targeted by the pair of inverters 60 and 70 enters the electric power controller 501 as a target power instruction. Instead of the target allocation ratio of electric power, a target amount of electric power targeted by the second inverter 70 may be input to the electric power controller 501 as well. Subsequently, in the first embodiment of the present invention, a phase of the voltage instruction vector is changed by adding the adjustment value to either a (below described) voltage phase-integration term Vθ2_intg or the voltage phase Vθ2 to render an actual value of either a power allocation ratio or an amount of electric power approximating either the target allocation ratio of electric power or the target amount of electric power. Hence, in the first embodiment of the present invention, a simple logic excluding a complex expression can effectively conduct electric power control. More specifically, according to the first embodiment of the present invention, a target allocation ratio of electric power (B[W]/(a+b)[W]) of an amount of electric power targeted by the second inverter 70 to a total amount of electric power collectively targeted by the pair of inverters 60 and 70 enters the electric power controller 501 as a target electric power instruction. Subsequently, a gradual change process is applied to such a target electric power instruction by a filter 411 provided in the electric power controller 501 to suppress a sudden change, thereby generating an instruction value instructing a target allocation ratio of electric power pw2_ratio_com for the second inverter 70. The target power allocation ratio instruction value pw2_ratio_com generated by completing the filtering process for the second inverter 70 is subsequently input to an electric power ratio comparator 55.

A voltage correction value calculator 42 is also provided to obtain a pair of first dq axes voltage instructions vd1 and a pair of vq1 and second dq axes voltage instructions vd2 and vq2. The voltage correction value calculator 42 also obtains the first input voltage VH1 and the second input voltage VH2. The voltage correction value calculator 42 subsequently multiplies the first and second dq axes voltage instructions vd1, vd2, vq1 and vq2 by ratios of the input voltages VH1 and VH2 to a total input voltage of these input voltages VH1 and VH2 by using the formula (3.1) shown below, thereby calculating voltage correction values vd1_ratio, vd2_ratio, vq1_ratio and vq2_ratio, respectively. These voltage correction values are equivalent to actual modulation degrees. Further, a synthetic voltage calculator 43 is also provided and calculates composite voltages vd and vq by using the formula (3.2) shown below.

$$vd1\_ratio = vd1 \times \frac{VH1}{VH1+VH2} vd2\_ratio \qquad \text{(Formula 3.1)}$$

$$= vd2 \times \frac{VH2}{VH1+VH2} vq1\_ratio$$

$$= vq1 \times \frac{VH1}{VH1+VH2} vq2\_ratio$$

$$= vq2 \times \frac{VH2}{VH1+VH2}$$

$$Vd = vd1\_ratio + vd2_{ratio} Vq = vq1\_ratio + vq2_{ratio} \qquad \text{(Formula 3.2)}$$

Subsequently, an electric power amount calculator 53 provided in the electric power controller 501 calculates an amount of electric power pw2 of the second inverter 70 and an amount of synthesis electric power pw based on the voltage correction values vd2_ratio and vq2_ratio calculated by the voltage correction value calculator 42, synthetic voltages vd and vq calculated by the synthetic voltage calculator 43, and the dq axes currents Id and Iq by using the formula (4.1) shown below. Subsequently, a power ratio calculator 54 also provided in the electric power controller 501 calculates an actual value pw2_ratio as a power allocation ratio of the second inverter 70 by using the below described formula (4.2).

$$pw2 = vd2\_ratio \times Id + vq2\_ratio \times Iq pw = vd \times Id + vq \times Iq \quad \text{(Formula 4.1)}$$

$$pw2_{ratio} = \frac{pw2}{pw} \quad \text{(Formula 4.2)}$$

The electric power ratio comparator 55 subsequently compares an actual value of the power allocation ratio pw2_ratio with the target power allocation ratio instruction value pw2_ratio_com. Subsequently, a voltage phase adjustment volume determiner 56 also provided in the electric power controller 501 determines based on the comparison result during a forward rotation powering time, for example, if the voltage phase adjustment value $\Delta V\theta 2$ is either "$-\alpha$" or "$\alpha$" ($\alpha>0$). Specifically, when the actual value of the power allocation ratio is less than the target power allocation ratio instruction value, the voltage phase is delayed by an angle of $\alpha$. By contrast, when the actual value of the power allocation ratio is more than the target power allocation ratio instruction value, the voltage phase is advanced by the angle of $\alpha$. Here, an equality ($\Delta V\theta 2=-\alpha$) is met when a unequality (pw2_ratio<pw2_ratio_com) is established. Also, an equality ($\Delta V\theta 2=\alpha$) is met when a un-equality (pw2_ratio>pw2_ratio_com) is established. However, depending on power running, regeneration, forward or backward rotation, conditions of delaying and advancing the angle of the voltage phase are exchanged.

Subsequently, in the adjustment value adder 36, an adjustment value $\Delta V\theta 2\_intg$ of a voltage phase integration term is added to the voltage phase integration term $V\theta 2\_intg$ calculated by the feed-forward and feedback calculator 34. The sum of these values is subsequently output as the phase V$\theta$2# of the second voltage instruction vector after allocation.

Now, an exemplary configuration and operation of an electric power controller 502 of a second embodiment of the present invention is described with reference to FIG. 9. The electric power controller 502 calculates a request torque based on either the target allocation ratio of electric power or the target amount of electric power and the number of revolutions of the MG. The electric power controller 502 further calculates a request voltage phase based on the request torque by using a torque calculation formula. Subsequently, the electric power controller 502 changes a phase of a voltage instruction vector by adding an amount of adjustment to either the voltage phase integration term $V\theta 2\_intg$ or the voltage phase V$\theta$2 to render an actual voltage phase approximating the request voltage phase. Hence, in the second embodiment of the present invention, since the request voltage phase is calculated by converting the target electric power instruction, a control cycle is shortened, thereby more effectively improving responsiveness when compared with the first embodiment of the present invention. Specifically, according to the second embodiment of the present invention, a target amount of electric power B [W] targeted by the second inverter 70 is input to the electric power controller 502 as the target power instruction, and is processed by a filter 412 provided therein to reduce an impact of a sudden change. The target amount of electric power B [W] completing the filtering process and the number of revolutions $\omega$ of the MG are input to a request torque calculator 57 provided in the electric power controller 502.

The request torque calculator 57 subsequently calculates a request torque trq2_req for the second inverter 70 by using the formula (5.1) shown below and outputs the request torque trq2_req to a request voltage phase calculator 58 also provided in the electric power controller 502. The request voltage phase calculator 58 calculates a request voltage phase V$\theta$2_req based on the request torque trq2_req, the revolution number $\omega$ of the MG, and an amplitude Vamp2 of the second voltage instruction vector by using the formula (5.2) shown below.

$$trq2\_req = \frac{B}{\omega} \quad \text{(Formula 5.1)}$$

$$trq2_{req} = \frac{p\phi Vamp2}{\omega Ld}\sin(V\theta 2_{req}) + \frac{p(Ld-Lq)Vamp2^2}{2\omega^2 LdLq}\sin 2(V\theta 2_{req}) \quad \text{(Formula 5.2)}$$

A voltage phase deviation calculator 59 provided in the electric power controller 502 subtracts an actual voltage phase V$\theta$2 from the request voltage phase V$\theta$2_req of the second voltage instruction vector, thereby calculating a voltage phase deviation. The voltage phase deviation is subjected to a response delaying process in a filter 595 also provided in the electric power controller 502, thereby generating either an adjustment value $\Delta V\theta 2\_intg$ of a voltage phase integration term or a voltage phase adjustment volume $\Delta V\theta 2$. Subsequently, in the adjustment value adder 36, either the adjustment value $\Delta V\theta 2\_intg$ of the voltage phase integration term or the voltage phase adjustment value $\Delta V\theta 2$ is added to either the voltage phase integration term V$\theta$2_intg or the voltage phase V$\theta$2 calculated by the feed-forward and feedback calculator 34, respectively. Each of these sums may subsequently be output as a phase V$\theta$2 # of the second voltage instruction vector after allocation. Now, an exemplary configuration and operation of an electric power controller 503 according to a third embodiment of the present invention is described with reference to FIG. 10. Specifically, the electric power controller 503 calculates a request voltage phase based on either the target allocation ratio of electric power or the target amount of electric power, a current and a voltage. Subsequently, the electric power controller 503 changes a phase of a vector of a voltage instruction by adding an amount of adjustment to either the voltage phase integration term V$\theta$2_intg or the voltage phase V$\theta$2 to render an actual voltage phase approximating the request voltage phase. Hence, according to the third embodiment of the present invention, since the request voltage phase is calculated by converting the target electric power instruction, the control cycle is shortened again, thereby more effectively improving responsiveness when compared with the first embodiment of the present invention as similar to the second embodiment. More specifically, according to the third embodiment of the present invention, a target amount of electric power B [W] targeted by the second inverter 70 is input to the electric power controller 503 as a target power instruction, and is processed by a filter 412 provided in the electric power controller 503 to reduce an impact of a sudden change. The target amount of electric power B [W] completing the filtering process, a current amplitude Iamp, a current phase Iθ, and an amplitude Vamp2 of a second voltage instruction vector are input to a request voltage phase calculator 58 provided in the electric power controller 503. The request voltage phase calculator 58 subsequently calculates a request voltage phase Vθ2_req by using the below described formula (6).

$$B = Vamp2 \times Iamp \times \cos(V\theta2_{req\text{-}I\theta})$$ (Formula 6)

Subsequently, a voltage phase deviation calculator 59 also provided the electric power controller 503 calculates a voltage phase deviation by subtracting an actual voltage phase Vθ2 from the request voltage phase Vθ2_req of the second voltage instruction vector. Remaining configurations and operations of the third embodiment of the present invention are substantially the same as those of the second embodiment of the present invention, and are not described.

As described heretofore, in each of the first to third embodiments of the present invention, the second inverter control circuit 302 includes the electric power controller 501, 502 or 503 that controls allocation of electric power supplied from the respective power supplies 11 and 12 to the pair of inverters 60 and 70 in accordance with the target electric power instruction. Further, in each of the first to third embodiments of the present invention, during the torque feedback control, electric power supplied from the pair of power supplies is adjusted by adjusting the voltage phase Vθ, thereby controlling allocation amounts of electric power supplied from the pair of power supplies. Hence, according to any one of the embodiments of the present invention, even when the voltage amplitude is fixed at a maximum value, allocation of the electric power supplied from the pair of power supplies can be adequately controlled while maintaining a prescribed torque. Accordingly, the SOC and a voltage value of the power supply can be supervised while effectively preventing a poor SOC and degradation of a battery in one power supply.

Figure 6:
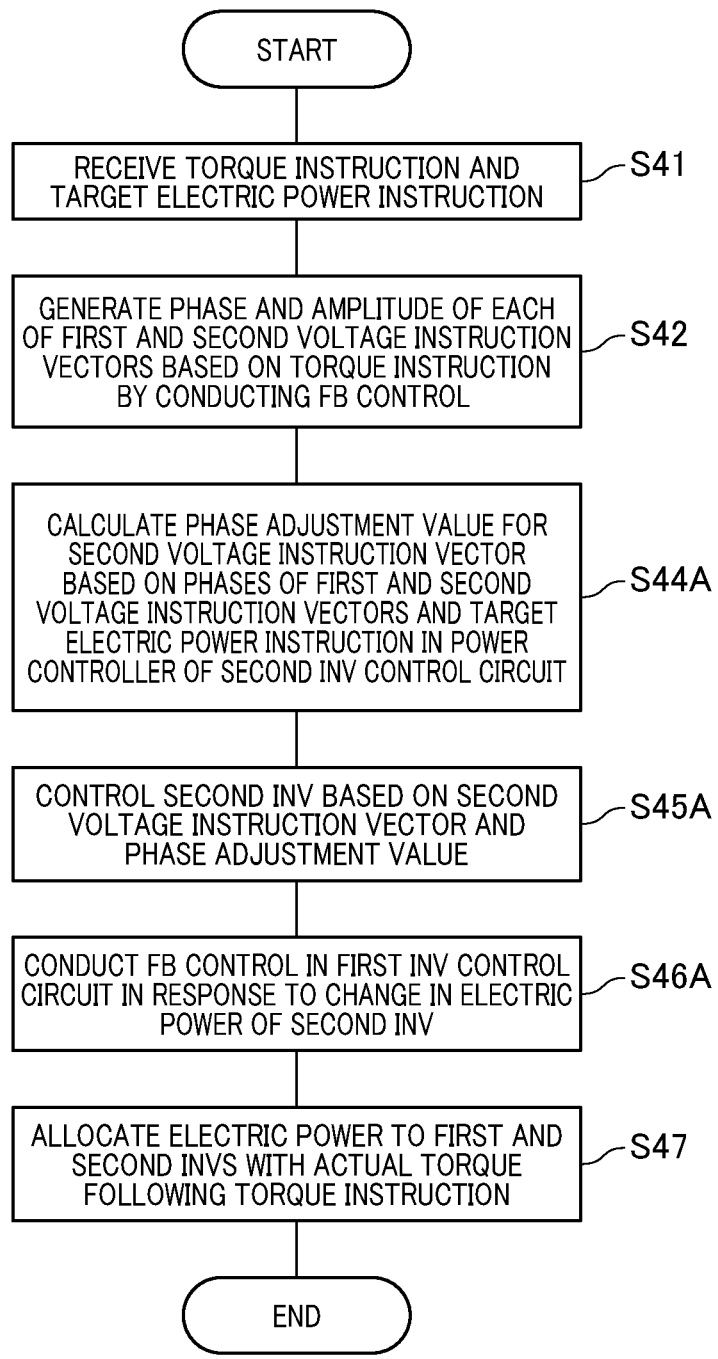
FIG. 6 is a flowchart illustrating an exemplary electric power allocation sequence performed by the electric power controller according to the first to third embodiments of the present invention.
Figure 11:
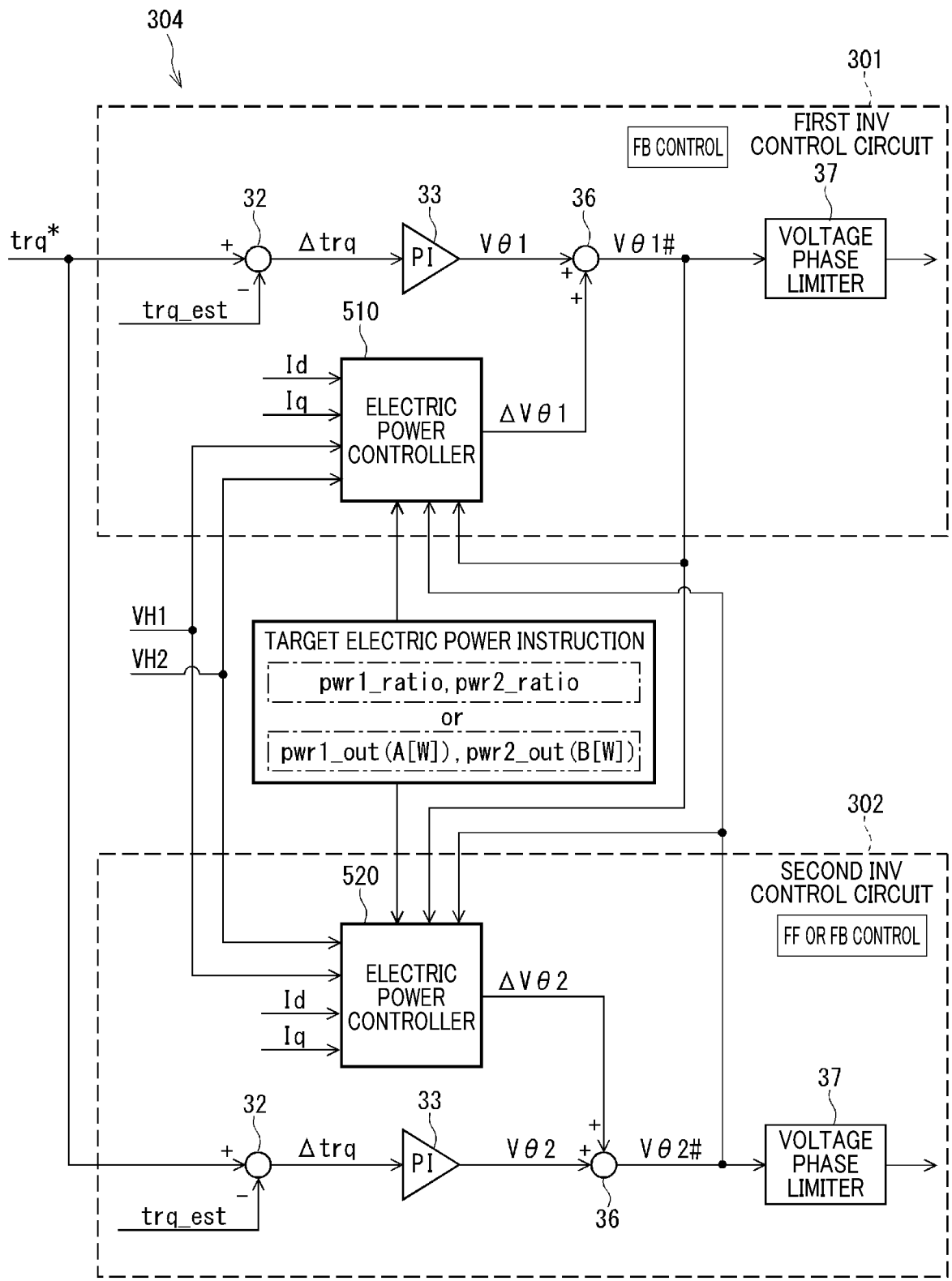
FIG. 11 is a block diagram illustrating exemplary various signals input and output in the electric power controller according to the fourth embodiment of the present invention.

Now, a fourth embodiment of the present invention is described with reference to FIGS. 11 and 12 which correspond to FIGS. 5 and 6 illustrating the first to third embodiments of the present invention, respectively. Specifically, in a control unit 304 of the fourth embodiment, two inverter control circuits 301 and 302 include power controllers 510 and 520, respectively. To each of the respective power controllers 510 and 520 of the first and second inverter control circuits 301 and 302, a post allocation phase Vθ1 # of the first voltage instruction vector, a post allocation phase Vθ2 # of the second voltage instruction vector, and substantially the same currents Id and Iq are input. Also input to each of the respective power controllers 510 and 520 are input powers VH1 and VH2 of the respective inverters 60 and 70, and a target electric power instruction.

These electric power controllers 510 and 520 respectively generate phase adjustment volumes ΔVθ1 and ΔVθ2 for first and second voltage instruction vectors. Two adjustment value adders 36 are included in the respective inverter control circuits 301 and 302 and add the phase adjustment volumes ΔVθ1 and ΔVθ2 to the respective voltage phases Vθ1 and Vθ2. These sums are subsequently output to voltage phase limiters 37 also included in respective inverter control circuits 301 and 302 as voltage phases Vθ1# and Vθ2# after allocation.

Now, an exemplary power allocation sequence executed by each of the electric power controllers 510 and 520 according to the fourth embodiment of the present invention is described with reference to a flowchart of FIG. 12. As shown there, steps S44B, S45B and S46B are different from corresponding steps of FIG. 6 as described below. Specifically, in step S44B, the electric power controllers 510 and 520 of the respective inverter control circuits 301 and 302 calculate phase adjustment volumes ΔVθ1 and ΔVθ2 for vectors of voltage instructions supplied to the respective inverters 60 and 70 based on first and second voltage instructions and a target power instruction as well. In step S45B, the respective inverter control circuits 301 and 302 control the inverters 60 and 70 based on the phases Vθ1# and Vθ2# of the voltage instruction vectors of post allocation obtained by adding the voltage phases Vθ1 and Vθ2 to the respective phase adjustment volumes ΔVθ1 and ΔVθ2. In step S46B, in response to a change in electric power in the respective inverters 60 and 70, the inverter control circuits 301 and 302 conduct feedback control. In step S47, electric power is allocated to the first inverter 60 and the second inverter 70 while rendering the torque following the instruction trq*.

Hence, according to the fourth embodiment of the present invention, with the electric power controllers 510 and 520 provided in the respective inverter control circuits 301 and 302, an amount of electric power transmitted between the pair of inverters 60 and 70 is reduced, thereby enabling similar control to current angle advancing control. In addition, an operation of switching the power supervising circuit and the power non-supervising circuit that conducts torque feedback control may be omitted. Accordingly, a request for switching the inverter 60 and the inverter 70 to control can also be omitted when charging and discharging processes are executed during powering and regeneration.

Herein below, various modifications of the above-described embodiments of the present invention are briefly described. First, as a power control system with a voltage amplitude fixed at a maximum value, a rectangular wave control system that operates at a modulation rate of about 1.27 is known. However, the present invention is not limited to the rectangular wave controlling system and can be applied to an excessive modulation control system with an upper limit of the modulation rate fixed at about 1.20.

Secondly, when a system employs a pair of independent power supplies, both of the power supplies are not necessarily the same secondary batteries, such as batteries, capacitors, etc. For example, one of the power supplies may be the secondary battery and the other one of the power supplies may be either a fuel cell or an electric power generator and the like as well.

Thirdly, the number of phases of the open windings of the electric motor 85 is not limited to three, and four or more phases can be employed. For example, open windings having two phases may be employed and are connected in a bridge form as well.

Fourthly, an electric motor driving system of the so-called dual power supply-dual inverter system is applied to a pure electric car, such as an electric motor car, a fuel-cell car, etc., an electrically rich hybrid power train, such as a plug-in hybrid (PHV), a range extender, etc., and a light electric vehicle, such as an integrated starter generator (ISG) generating about 12 volt to about 48 volt, etc. Since this technology is based on a voltage type circuit topology applicable to a use, in which a high output is highly effectively generated without using a conventional technology of a booster circuit with a reactor. Hence, the technology is also suitable for portions of the various cars, in which the high output is requested but is hardly obtained by the conventional booster circuit due to a heat problem.

Again, as described heretofore, in a so-called dual power supply-dual inverter system, in which a voltage amplitude is fixed at a maximum value, an electric motor driving system capable of appropriately controlling allocation of electrical power supplied from a pair of power supplies to a pair of inverters, respectively, is provided.

Numerous additional modifications and variations of the present disclosure are possible in light of the above teachings. It is therefore to be understood that within the scope of the appended claims, the present disclosure may be executed otherwise than as specifically described herein. For example, the electric motor driving system is not limited to the above-described various embodiments and may be altered as appropriate. Similarly, the electric motor driving method is not limited to the above-described various embodiments and may be altered as appropriate.

What is claimed is:

1. An electric motor driving system to control driving of an electric motor including multiple windings of two or more phases each having open ends, the electric motor driving system comprising:
    a first inverter connected to a first power supply at a first end of the first inverter to receive a direct current electric power from the first power supply, the first inverter including at least two switching elements respectively connected to the open ends of the windings at a second end of the first inverter;
    a second inverter connected to a second power supply at a first end of the second inverter to receive a direct current electric power from the second power supply, the second inverter including at least two switching elements respectively connected to the open ends of the windings at a second end of the second inverter;
    a control unit including:
        a first inverter control circuit configured to:
            receive a torque instruction from an outside of the electric motor driving system;
            conduct torque feedback control; and
            generate a first voltage instruction of a first voltage vector defined on a dq-axis plane based on the torque instruction, the first voltage instruction being output to the first inverter;
        a second inverter control circuit configured to:
            receive the torque instruction from the outside of the electric motor driving system;
            conduct torque feedback control; and
            generate a second voltage instruction of a second voltage vector defined on the dq-axis plane based on the torque instruction, the second voltage instruction being output to the second inverter; and
        at least one electric power controller included in at least one of the first inverter control circuit and the second inverter control circuit, the at least one electric power controller being configured to:
            receive a target electric power instruction from the outside of the electric motor driving system, the target electric power instruction including one of a target allocation ratio of electric power and a target amount of electric power, the target allocation ratio being a target ratio at which the electric power of the first and second power supplies is allocated between the first and second inverters, the target amount of electric power being an amount of electric power targeted by at least one of the first and second inverters;
            conduct electric power allocation control of allocating the electric power supplied from the first power supply and the second power supply to the first inverter and the second inverter according to the target electric power instruction during the torque feedback control;
            either advance or delay an angle of a phase of at least one of the first and second voltage vectors of the at least one of the first and second voltage instructions in a corresponding one of the first and second inverter control circuits while maintaining an amplitude of the voltage vector fixed at a maximum level to either cause an actual allocation ratio of electric power between the first and second inverters to conform to the target allocation ratio or cause an actual amount of electric power of the at least one of the first and second inverters to conform to the target amount of electric power included in the target electric power instruction, the actual allocation ratio of electric power being a ratio at which electric power of the first and second power supplies is currently allocated between the first and second inverters, and the actual amount of electric power of the at least one of the first and second inverters being an amount of electric power currently supplied to the at least one of the first and second inverters; and
            determine either an advanced or delayed angle of the phase of the at least one of the first and second voltage vectors by calculating the following equality, where Pwr_all represents a total electric power consumed by the first and second inverters, Vmean represents a voltage effective value, Irms represents a current effective value, and φ represents a power factor angle, Vamp represents an amplitude of a synthesis vector as a synthesis of the first and second voltage vectors, Iamp represents an amplitude of a current commonly flowing in the first and second inverters, Vθ represents a phase of the synthesis vector, and Iθ represents a phase of a current commonly flowing through the first and second inverters, Vamp1 and Vamp2 represent amplitudes of the first and second respective voltage vectors, each of Vθ1 and Vθ2 represents the advanced or delayed angle of the phase of the first and second voltage vectors, and cos (Vθ−Iθ) represents power factor:

$$Pwr_{all} = \sqrt{3} \times Vmean \times Irms \times \cos \varphi$$

$$= \sqrt{3} \times Vamp \times 1/\sqrt{3} \times Iamp \times \cos (V\theta - I\theta)$$

$$= Vamp1 \times Iamp \times \cos (V\theta 1 - I\theta) + Vamp2 \times Iamp \times \cos (V\theta 2 - I\theta).$$

2. The electric motor driving system as claimed in claim 1, wherein one of the first inverter control circuit and the second inverter control circuit acts as an electric power supervising circuit by including the at least one electric power controller therein, and the other one of the first inverter control circuit and the second inverter control circuit acts as an electric power non-supervising circuit by excluding the at least one electric power controller to be affected by control of the electric power supervising circuit, wherein only the at least one electric power controller of the electric power supervising circuit changes the phase of the vector of an applicable one of the first and second voltage instructions in the electric power supervising circuit allocates a given amount of electric power supplied from the first and second power supplies to one of the first and second inverters supervised by the electric power supervising circuit, wherein a given amount of remaining power supplied from the first and second power supplies is allocated to the other one of the first and second inverters not supervised by the electric power supervising circuit when the electric power non-supervising circuit conducts the at least torque feedback control.

3. The electric motor driving system as claimed in claim 2, wherein the at least one electric power controller changes the phase of the vector of the applicable one of the first and second voltage instructions to render the actual value of either the electric power allocation ratio between the first and second inverters or the amount of electric power of at least applicable one of the first and second inverters approximating either the target allocation ratio of electric power or the target amount of electric power.

4. The electric motor driving system as claimed in claim 2,
wherein the at least one electric power controller calculates a request voltage phase based on either the target allocation ratio of electric power or the target amount of electric power and a number of revolutions of the electric motor, and
the at least one electric power controller changes the phase of the vector of applicable one of the first and second voltage instructions to render a phase of an actual voltage of applicable one of the first and second inverters approximating the request voltage phase.

5. The electric motor driving system as claimed in claim 2,
wherein the at least one electric power controller calculates a request voltage phase based on either the target allocation ratio of electric power or the target amount of electric power, a current and a voltage, and
the at least one electric power controller changing the phase of the vector of the applicable one of the first and second voltage instructions to render a phase of an actual voltage of applicable one of the first and second inverters approximating the request voltage phase.

6. The electric motor driving system as claimed in claim 1, wherein the first and second inverter control circuits include the electric power controllers and change the phases of the vectors of the first and second voltage instructions, respectively.

* * * * *